Aug. 5, 1969 N. S. MILLER 3,459,018
METHOD OF AND APPARATUS FOR BENDING BARS
Filed Feb. 4, 1966

United States Patent Office 3,459,018
Patented Aug. 5, 1969

3,459,018
METHOD OF AND APPARATUS FOR BENDING BARS
Neil S. Miller, Glasgow, Scotland, assignor to The University Court of the University of Glasgow, Glasgow, Scotland, a British corporate body
Filed Feb. 4, 1966, Ser. No. 525,021
Int. Cl. B21b *37/14, 37/00;* B30b *15/26*
U.S. Cl. 72—7
9 Claims

ABSTRACT OF THE DISCLOSURE

A method and apparatus for bending a bar to a desired profile. The bar passes through a bending device which applies a transverse force thereto; said bending device being operable to bend the bar, or to correct a previous bend if necessary, in response to previously stored information concerning the radius of curvature and the X and Y coordinates of the bent portion of the bar.

---

Figure 1:
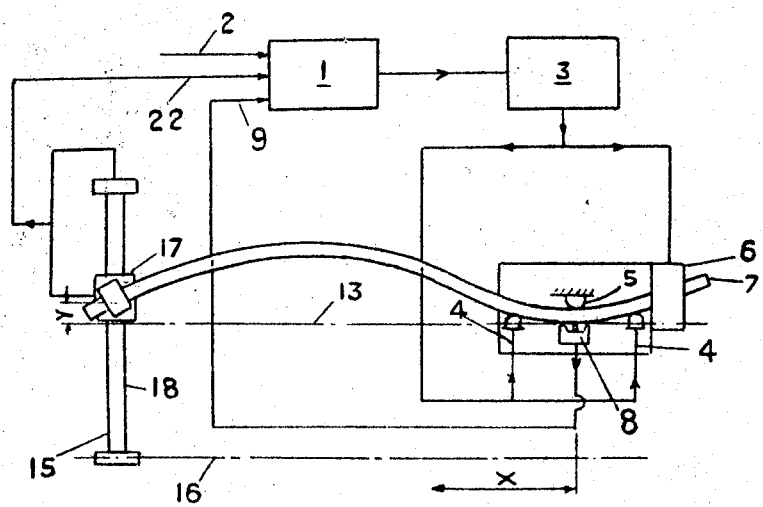

This invention relates to a method of and apparatus for producing bent bars of predetermined shapes and particularly bars for use as ships' frames.

The method and apparatus according to the present invention lend themselves to control of the bending operations by the principle of automation so that the predetermined shape of a bar expressed in mathematical terms and stored as a programme can be reproduced by a machine working to the programme.

A method of producing a bent bar having a predetermined profile according to the invention includes the steps of determining the number of separate bending operations necessary to produce the desired shape, defining the desired shape of a portion of the bar in terms of the radius of curvature of that portion of the bar and the desired shape of the remainder of the bar as a series of coordinates of the positions of the free end of the bar after successive bending operations with reference to a selected datum line, bending a length of the bar at one end of the bar to the desired profile by at least one bending and gauging operation consisting in applying a transverse bending force to the bar, releasing the bending force and allowing the bar to spring back, gauging the curvature of the bar, applying if necessary a correcting force to bring the curvature within a predetermined deviation from the predetermined curvature required to provide the desired profile, then forming the remainder of the bar to the desired shape by at least one other bending and gauging operation consisting in feeding the bar endwise a predetermined distance in the direction towards the bent end, applying a transverse bending force to the unbent portion of the bar, releasing the bending force and allowing the bar to spring back, measuring the deviation of the actual new position of the free end of the bar from its calculated position as defined by the appropriate coordinates and applying if necessary a correcting transverse bending force to bring the actual new position of the free end of the bar to within a predetermined distance of said calculated position.

Normally the initial bending and gauging operation will be performed in a number of successive similar actions and normally the operation of bending and gauging the remainder of the bar to the desired shape will consist in feeding the bar endwise a predetermined distance in a number of steps towards the bent end and after each feeding operation applying a transverse bending force to the free portion of the bar so that this other bending operation is also performed in a number of steps.

Apparatus for performing the method incorporates control means including means for storing information relating to the radius of curvature of the portion of the bar the shape of which is so defined and to the coordinates of the desired position of the free end of the bar after each bending operation, information relating to the amount by which it is permissible to deviate from said radius of curvature and said coordinates and information relating to distances by which the bar is to be fed between successive bending operations, and signal-generating means for extractng information from the information-storing means and translating said information into control signals, means for feeding a bar longitudinally a distance according to a distance signal received from the signal-generating means, means for applying a transverse bending force to the bar according to a bending signal received from the signal-generating means, means for gauging the shape assumed by the bar and means for comparing the shape assumed by the bar with the desired shape as defined by the stored information relating to the radius of curvature and the coordinates, and if such actual shape is outside the permissible deviation from the desired shape sending a correcting signal to the means for applying the bending force to apply a correcting bending force to the bar.

The means for applying the transverse bending force may be a three point bending machine of known type.

The radius of curvature and the coordinates of the desired shape of the bar may be determined by a computer.

The information relating to the radius of curvature and the coordinates of the desired shape of the bar and the information relating to the distance by which the bar is to be fed during performance of the process may be determined by a computer. The information relating to the amount by which it is permissible to deviate from said radius of curvature and coordinates may be stored in the control means. The control means may also store information relating to the speed at which the bars is to be fed during performance of the process.

The information may be stored on a tape.

In determining the radius of curvature and the coordinates of the desired shape the computer may be programmed to make allowance for a calculated amount by which a bar normally requires to be over-bent to compensate as closely as possible for spring back. While it is not contemplated, owing to the complexity of the calculations involved, that it will be possible to overbend by exactly the correct amount such that on spring back the bar assumes exactly the calculated shape, by introducing an overbending factor it is possible to reduce the number of correcting bending actions necessary and thus reduce the overall time required to form the bar to the desired shape.

The apparatus may include means for receiving the free end of the bar and moving along with the free end of the bar as bending progresses, said means being contrived to feed back to the information-storing means signals relating to the actual coordinates of the free end of the bar in relation to a datum line. Said means may consist of a main carriage movable along fixed guideways, said carriage carrying a subsidiary carriage movable along guideways mounted in the main carriage and disposed at right angles to the fixed guideways in which the main carriage is movable, the free end of the bar being clamped to the subsidiary carriage by means permitting the bar to swing with respect to the subsidiary carriage.

The means for feeding the bar may consist of hardened rollers, means being provided for measuring and controlling the angle of rotation of one of the rollers.

The apparatus may include clamping means for holding the bar during each bending operation and means may be provided to move the bar clear of the clamping means during each feeding operation.

The positions of the free end of the bar may be expressed as Cartesian or polar coordinates.

It has been found most suitable to express the positions of the free end of the bar in Cartesian coordinates one of which is the distance of the free end of the bar from a datum line which is the tangent to the portion of the bar at the centre point of the three point bending machine, and the other of which is the distance from said centre point of the point where the first-mentioned coordinate meets the datum line.

For ease of measurement the tangent must coincide with the datum line and to ensure this the bending machine may be equipped with a tangent-sensing device which may consist of fingers engageable with the bar being bent and a sensitive probe located between the fingers and also engageable with the bar, the probe being connected to a transducer, the fingers and the probe being swingable bodily according to the position of the bar. The position of the probe with respect to the fingers provides a measure of the radius of curvature of the bar and the angular position of the fingers when in contact with the bent bar provides an indication of the direction of the tangent to the bar. The probe and the fingers send signals to the control means, the signal from the probe controlling the amount of transverse bending force applied and the signal from the fingers controlling the proportions of the total transverse bending force applied at the outer points of the three point bending machine whereby to cause the tangent to the bent bar at the centre point of the bending machine to be aligned with the datum line.

It is not strictly necessary for the tangent to coincide with the datum line provided the angle by which the tangent deviates from the datum line is measured as then an appropriate correction may be made, but the calculations are simplified if the tangent is made to coincide with the datum line.

Means may be incorporated for gauging and checking the dimensions of a bar applied to the machine before the first bending operation is performed. Such checking signal may be effective to determine the position of the datum line as the position of the datum line is determined by the position of the longitudinal edge of the bar in contact with the two outer points of the three point bending device.

Means may be incorporated in the control means for taking account of the magnitude and sign of the deviation from the predetermined values of the measured values of the radii of curvature and the coordinates after each bending operation, even when these are within the acceptable limits, and incorporating these deviations as correcting factors during the next feeding and bending operation so that such deviations do not become cumulative.

Figure 3:
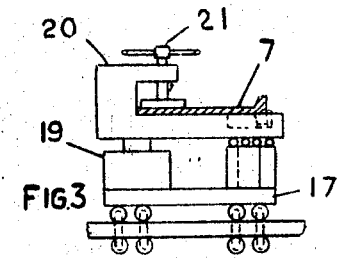
Figure 4:
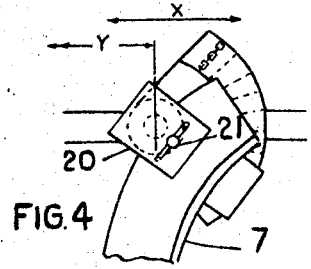
Figure 2:
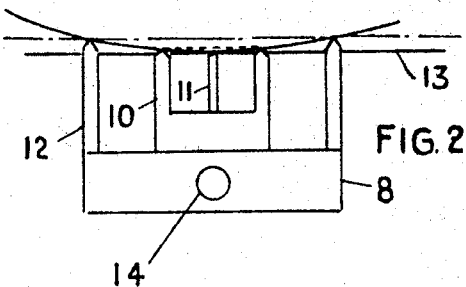
Figure 5:
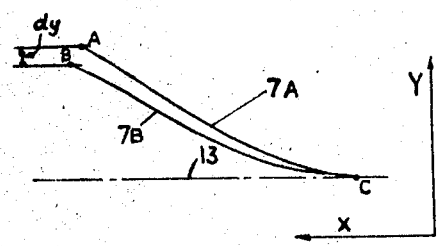
Figure 6:
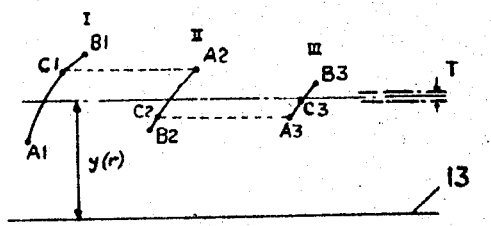

A practical embodiment of the invention is illustrated in the accompanying semi-diagrammatic drawings in which FIG. 1 shows a general layout of a machine, FIG. 2 shows to a scale larger than in FIG. 1 the means for gauging the shape assumed by the bar after a bending operation. FIG. 3 is a view looking in the direction of the arrow A in FIG. 1 of a construction for clamping a bar being sent to the carriage, FIG. 4 is a plan view of the construction illustrated in FIG. 3, FIG. 5 is a diagram showing the manner in which a bar being bent springs back after a bending operation, and FIG. 6 is a diagram showing how several successive correcting bending operations bring the bar within the acceptable limit of tolerance.

In the drawings, 1 denotes means for storing information relating to the radius of curvature of the bar and the coordinates of the desired position of the free end of the bar after each bending operation, information relating to the amount by which it is permissible to deviate from said radius of curvature and said coordinates and information relating to distances by which the bar is to be fed in the X direction between successive bending operations. All this information is fed to the information-storing means 1 in an input signal represented by 2. The input signal 2 may come from a computer. 3 denotes signal-generating means for extracting information from the information storing means 1 and translating said information into control signals to be fed to a bending machine consisting of rams 4 arranged to come against the bar to bend it against a fixed abutment 5 and to feeding mechanism 6 for feeding the bar 7 longitudinally a distance according to a distance signal received from the signal-generating means 3. The information-storing means 1 and the signal-generating means 3 together constitute control means. 8 denotes means for gauging the shape assumed by the bar and for sending a signal of the shape back to the information-storing means 1. Said signal is denoted by 9. The means 8 consists of fingers 10 which, in conjunction with a probe 11 located between the fingers, measure the curvature of the bar, and other fingers 12 which measure the angle of the tangent of the bent bar with respect to a datum line 13.

The means 8 is pivoted to the frame of the machine at 14. 15 denotes a main carriage movable along fixed guideways 16, the main carriage 15 carrying a subsidiary carriage 17 movable along guideways 18 mounted in the main carriage 15 and disposed at right angles to the fixed guideways 16. The subsidiary carriage 17 carries a bearing block 19 in which a clamping block 20 is swingable, said clamping block incorporating means 21 to clamp the end of the bar 7 being bent. The positions occupied by the main carriage 15 and by the subsidiary carriage 17 are sent as control input signals 22 to the information-storing means 1. Referring to FIG. 5, 7A and 7B denote the positions occupied by the bar 7 after bending but before spring-back takes place and after spring-back has taken place respectively. The differential $dy$ represents the amount by which the initial position of the free end of the bar before spring-back has taken place deviates from the final position of the same end of the bar after spring-back has taken place measured in the direction of travel of the subsidiary carriage 17, i.e. measured in the Y direction. FIG. 6 illustrates diagrammatically the action of over-bending and correcting for spring-back to bring the end of the bar being bent to a position within the accepted tolerance of deviation T from the calculated position with respect to the Y axis. In this figure the three typical curves I, II and III denote three successive bending and correcting actions making up a complete bending operation. There may, of course, be more or fewer than three bending actions making up any particular bending operation. $y(r)$ represents the calculated ordinate of the desired position of the end of the bar after bending. In the curve relating to bending operation I, A1 represents the starting position of the end of the bar before any bending force is applied, B1 represents the position of the end of the bar after the bending force has been applied but before the bar has been allowed to spring back, and C1 represents the position of the end of the bar after spring-back has taken place. Similarly A2, B2 and C2 represent the positions of the end of the bar at the same stages in bending operation II, and A3, B3 and C3 represent the positions of the end of the bar at the same stages in bending operation III.

In practice, to bend a bar 7 to a desired profile the number of bending operations to produce this profile is determined and the radius of curvature of the first part of the bar is obtained and the coordinates of the free end of this first part of the bar are then determined together with the amount of feed for each bending operation. All this information may be calculated by a computer and fed as the input signal 2 into the information-storing means 1. The bar 7 is then put into the feeding mechanism 6 for feeding into the bending machine and the machine is set in operation. The signal-generating means 3 extracts the requisite information from the information-storing means 1 and translates the information into control signals which it applies to the bending machine 4 and the feeding mechanism 6. The following actions then take place. The feeding mechanism 6 feeds the bar 7 the predetermined distance into the machine and stops the feeding action at the appropriate point. The bending machine 4, 5 then operates and continues the bending action until the gauging means 8 determines that the bar has been bent to the predetermined radius which includes an allowance for spring-back. The rams 4 are then retracted thus allowing the bar to spring back and the gauging means 8 gauges the shape assumed by the bar 7 and sends a signal back to the control information-storing means 1 in accordance with that shape. The desired shape as actually defined by the stored information relating to the radius of curvature of the first portion of the bar and if the actual shape is outside the permissible deviation from the desired shape the signal-generating means 3 receives information to that effect from the information-storing means 1 and sends a correcting signal to the bending machine 4, 5 so that a correcting bending force is applied in the appropriate direction to bring the bent bar 7 towards the desired shape. This correcting operation is continued until the bent bar is within the permissible limits. The feeding means 6 is again actuated and the next portion of the bar is then bent as described. These bending operations proceed until the bent end of the bar projects far enough from the machine for it to be engaged with the subsidiary carriage 17 to which it is clamped. The bending operations then continue according to the programme stored in the control means but now the coordinates of the free end of the bar after each bending action are compared with the stored coordinates in the information-storing means 1 and correcting action applied as necessary. The coordinates measured are, first, the Y coordinate, i.e. the distance $y(r)$ from the free end of the bar to the datum line 13 which is the tangent to the portion of the bar at the centre point 14 of the three point bending machine and, second, the X coordinate, i.e. the distance of the point where the Y coordinate meets the datum line 13 from the centre point 14 of the three point bending machine. As these coordinates are correct only if the tangent coincides with the datum line 13 the tangent-sensing means 8 operates to proportion the bending force between the two outer points 4 of the three point bending machine in such wise as to swing the bar to the position in which the said tangent coincides with the datum line 13. This correcting action takes place as every bending operation is performed.

For more detailed information on the bending and correcting actions reference should be made to FIG. 6 in which it will be seen that when a bar the free end of which lies at the position A1 is subjected to a bending force the free end moves to the position B1 and after the bar is allowed to spring back the free end goes to the position C1 in the first bending operation. The signal 9 or 22 sent to the information-storing means 1 shows that the deviation now is the difference between the ordinate $y(r)$ and the Y ordinate of the point C1, and is greater than the permissible tolerance T so that at least one more bending action is necessary. In the second bending operation represented by the curve II the end of the bar starts at the position A2 and after bending is at the position B2. After spring back the end of the bar is at the position C2 and the amount by which the end of the bar deviates from the required position is represented by the difference between the ordinate $y(r)$ and the Y ordinate of the point C2. This difference is still outside the allowable tolerance T. Details of this difference are sent again at a signal 9 or 22 to the information-storing means 1, and since the deviation is outside the allowable tolerance T the signal-generating means 3 is again actuated to initiate a third correcting action. In this correcting action the end of the bar lying at the position A3 is bent to the position B3 and after spring-back lies in the position B3, and since this position is within the accepted tolerance T the signal-generating means 3 now sends a feeding signal to the feeding mechanism 6 to feed the bar 7 a predetermined distance for the next bending operation to take place. The next bending operation is performed in the same manner as that described.

The system of determining the profile of the bar by measuring the coordinates of the free end of the bar provides a more accurate control over the shape of the bar than merely measuring the curvature of the bar and the curvature of the bar is measured in the initial bending operations merely because in the normal bending machine the bent end of the bar is not available for setting off coordinates until a portion of the bar is already bent so that the only reference dimension which is readily measurable is the curvature of the bar until a portion of the bar protrudes from the machine.

Owing to changes in the composition of the material of the bar and irregularities in the dimensions of any bar of a particular norminal size as a result of the usual manufacturing tolerances it is not possible to calculate exactly the amount by which a bar must be overbent to allow for spring back and for this reason at least one gauging and correcting operation must be performed with every bending operation.

What is claimed is:

1. A method of producing a bent bar having a predetermined profile including the steps of recording a signal containing (a) information concerning the number of separate bending operations necessary to produce the desired shape, (b) information concerning the desired radius of curvature of a portion of the bar at one end of the bar, and (c) information concerning the desired shape of the remainder of the bar in the form of a series of coordinates of the position of the opposite end only of the bar after successive bending and gauging operations with reference to a selected datum line, bending a length of the bar at said one end of the bar to the desired profile by at least one bending and gauging operation comprising applying a transverse bending force to the bar, releasing the bending force and allowing the bar to spring back gauging the curvature of the bar, applying if necessary a correcting force to bring the curvature within a predetermined deviation from the predetermined curvature required to provide the desired profile, then forming the remainder of the bar to the desired shape by at least one other bending and gauging operation comprising feeding the bar endwise a predetermined distance in the direction towards the bent end, applying a transverse bending force to the unbent portion of the bar, releasing the bending force and allowing the bar to spring back, measuring the deviation of the actual new position of said opposite end of the bar from its calculated position as defined by the appropriate coordinates and applying if necessary a correcting transverse bending force to bring the actual new position of the free end of the bar to within a predetermined distance of said calculated position.

2. The method as claimed in claim 1 in which the initial bending and gauging operation is performed in a number of successive similar actions and the operation of bending and gauging the remainder of the bar to the desired shape consists in feeding the bar endwise a predetermined distance in a number of steps towards the bent end and after each feeding operation applying a transverse bending force to the free portion of the bar so that this other bending operation is also performed in a number of steps.

3. Apparatus for bending a bar to a predetermined profile incorporating control means including means for storing information relating to (a) the desired radius of curvature of a portion at one end of the bar, (b) the coordinates of the desired position of the opposite end of the bar after each bending operation with reference to a selected datum line, (c) information relating to the amount by which it is permissible to deviate from said radius of curvature and said coordinates and (d) information relating to distances by which the bar is fed between successive bending operations, signal-generating means for extracting information from the information-storing means and translating said information into control signal, means for feeding a bar longitudinally a distance according to a distance signal received from the signal-generating means, means for applying a transverse bending force to the bar according to a bending signal received from the signal-generating means, means for measuring the shape assumed by the bar and means for comparing the shape assumed by the bar with the desired shape as defined by the stored information relating to the radius of curvature and the coordinates, and if such actual shape is outside the permissible deviation from the desired shape sending a correcting signal to the means for applying the bending force to apply a correcting bending force to the bar.

4. Apparatus as claimed in claim 3 including means for receiving the free end of the bar and moving along with the free end of the bar as bending progresses, said means being contrived to feed back to the information-storing means signals relating to the actual coordinates of the free end of the bar in relation to the datum line.

5. Apparatus as claimed in claim 4 in which the means for receiving the free end of the bar consists of a main carriage movable along fixed guideways, a subsidiary carriage movable along guideways mounted in the main carriage and disposed at right angles to the fixed guideways in which the main carriage is movable, and means for clamping the free end of the bar to the subsidiary carriage in such ways as to permit the bar to swing with respect to the subsidiary carriage.

6. Apparatus as claimed in claim 3 in which the means for feeding the bar consists of hardened rollers, means being provided for measuring and controlling the angle of rotation of one of the rollers.

7. Apparatus as claimed in claim 3 including clamping means for holding the bar during each bending operation, means being provided to move the bar clear of the clamping means during each feeding operation.

8. Apparatus as claimed in claim 3 including a tangent-sensing device consisting of fingers engageable with the bar being bent, a sensitive probe located between the fingers and also engageable with the bar, and a transducer to which the probe is connected, the fingers and the probe being swingable bodily according to the position of the bar.

9. Apparatus as claimed in claim 8 including a three point bending machine in which the probe and the fingers are arranged to send signal to the control means, the signal from the probe controlling the amount of transverse bending force applied and the signal from the fingers controlling the proportions of the total transverse bending force applied at the outer points of the three point bending machine whereby to cause the bar to be bent while causing the tangent to the bent bar at the central point of the bending machine to be aligned with the datum line.

References Cited

UNITED STATES PATENTS

| | | | |
|---|---|---|---|
| 2,604,924 | 7/1952 | Blake et al. | 72—386 |
| 3,075,568 | 1/1963 | Bright | 72—34 |
| 3,333,445 | 8/1967 | Mergler et al. | 72—702 |
| 3,352,136 | 11/1967 | Clarke | 72—9 |

CHARLES W. LANHAM, Primary Examiner

LOWELL A. LARSON, Assistant Examiner

U.S. Cl. X.R.

72—14, 384, 702